United States Patent
Park et al.

(10) Patent No.: US 9,571,754 B2
(45) Date of Patent: Feb. 14, 2017

(54) MOBILE TERMINAL AND METHOD OF CONTROLLING THE SAME

(71) Applicant: LG ELECTRONICS INC., Seoul (KR)

(72) Inventors: Chanyong Park, Seoul (KR); Sangjin Kim, Seoul (KR); Karam Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/992,991

(22) Filed: Jan. 11, 2016

(65) Prior Publication Data

US 2016/0330384 A1    Nov. 10, 2016

(30) Foreign Application Priority Data

May 6, 2015   (KR) .................. 10-2015-0063245

(51) Int. Cl.
| | | |
|---|---|---|
| *G06K 9/40* | (2006.01) | |
| *H04N 5/262* | (2006.01) | |
| *G06K 9/00* | (2006.01) | |
| *G06F 3/0488* | (2013.01) | |
| *G06F 3/0484* | (2013.01) | |
| *G06F 3/0481* | (2013.01) | |

(52) U.S. Cl.
CPC .......... *H04N 5/2628* (2013.01); *G06F 3/0488* (2013.01); *G06F 3/04817* (2013.01); *G06F 3/04845* (2013.01); *G06K 9/00268* (2013.01)

(58) Field of Classification Search
CPC .............. G06T 5/001; G06T 5/20; G06T 5/40; G06T 5/50; G06T 2207/30201; G06K 9/40; G06K 9/00221; G06K 9/00228; G06K 9/00234; G06K 9/00241; G06K 9/00248; G06K 9/00255; G06K 9/00261; G06K 9/00268; A61B 5/1176; G06F 17/30793

See application file for complete search history.

(56) References Cited

U.S. PATENT DOCUMENTS

| | | | |
|---|---|---|---|
| 7,697,736 B2* | 4/2010 | Kee ..................... | G06K 9/00248 382/118 |
| 8,126,208 B2 | 2/2012 | Steinberg et al. | |
| 8,290,277 B2* | 10/2012 | Hwang .............. | G06K 9/00248 382/254 |
| 2015/0086132 A1 | 3/2015 | Tsukagoshi | |

OTHER PUBLICATIONS

Wolfgang Hugemann, "Correcting Lens Distortions in Digital Photographs," URL:https://www.imagemagick.org/Usage/lens/correcting lens distortions.pdf, [retrieved on Nov. 17, 2016].

(Continued)

*Primary Examiner* — Duy M Dang

(74) *Attorney, Agent, or Firm* — Lee, Hong, Degerman, Kang & Waimey

(57) ABSTRACT

Disclosed are a mobile terminal and a method of controlling the same. The mobile terminal includes a camera configured to photograph an external environment, a display unit configured to display an image captured by the camera, and a control unit configured to extract, from the image, at least one object corresponding to a face in the external environment and control the display unit to correct the image by modifying a certain region of the at least one object, based on a distance from a center of the image to the at least one object.

20 Claims, 19 Drawing Sheets

(56) References Cited

OTHER PUBLICATIONS

"Using Adobe Photoshop CS5," 639 pgs., http://help.adobe.com/en_US/photoshop/cs/using/photoshop_cs5_help.pdf, Last updated Dec. 5, 2011.
European Patent Application No. 15003556.6, Search Report dated Dec. 13, 2016, 13 pages.

* cited by examiner

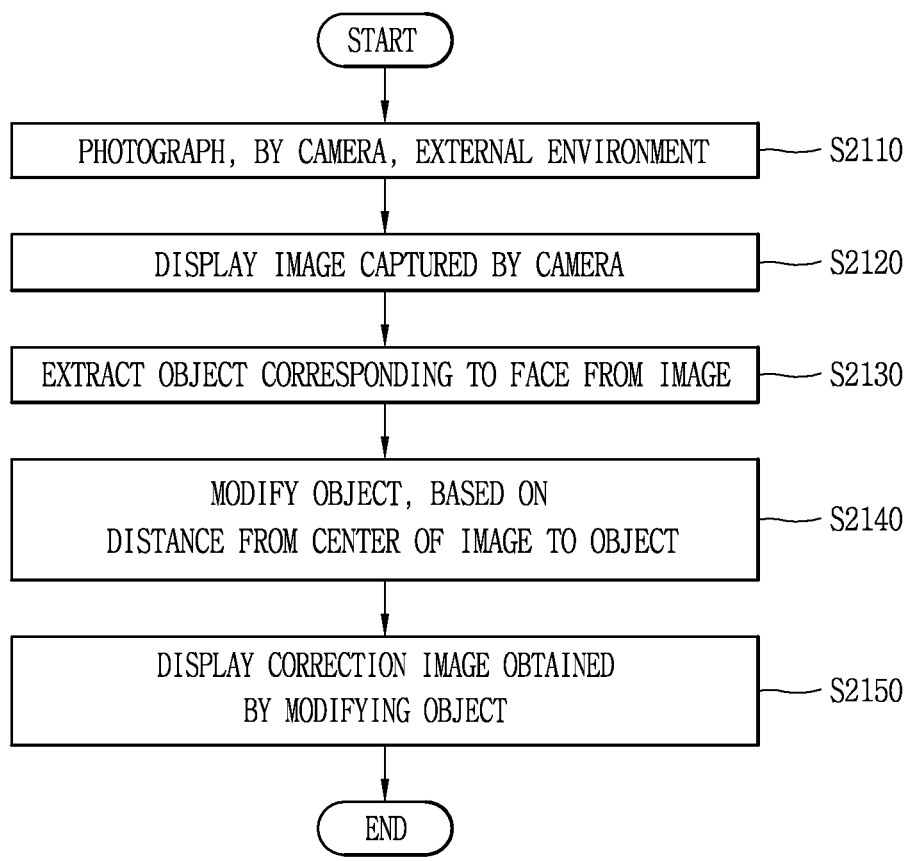

EQUATION 1.
$x\,corrected = x(1+R_1 r^2 + R_2 r^4 + R_3 r^6)$

EQUATION 2.
$y\,corrected = y(1+R_1 r^2 + R_2 r^4 + R_3 r^6)$

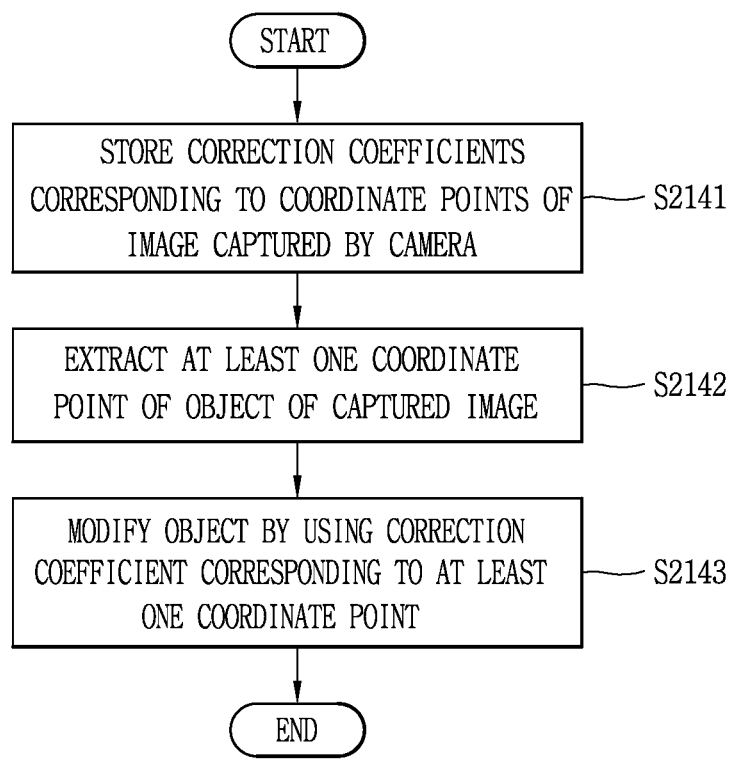

FIG. 7B
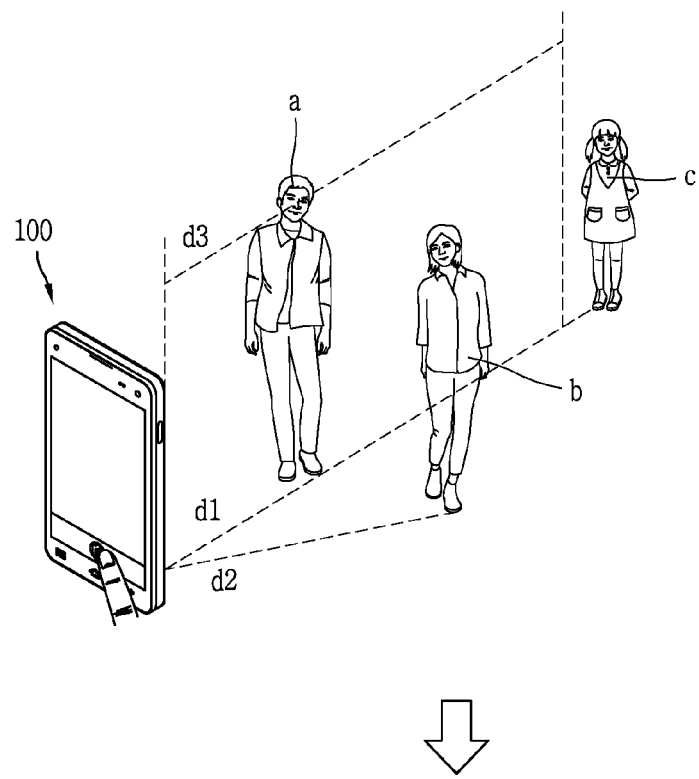
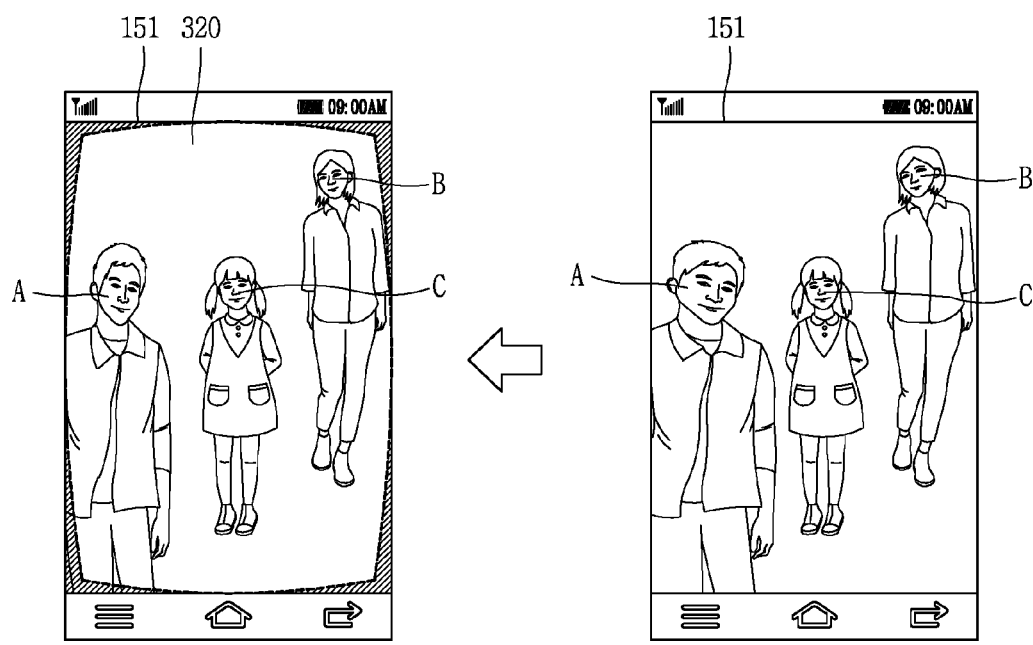

FIG. 10
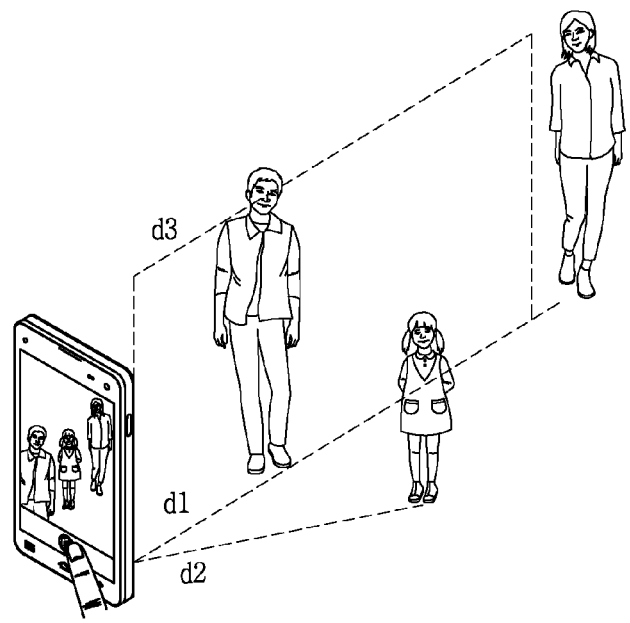
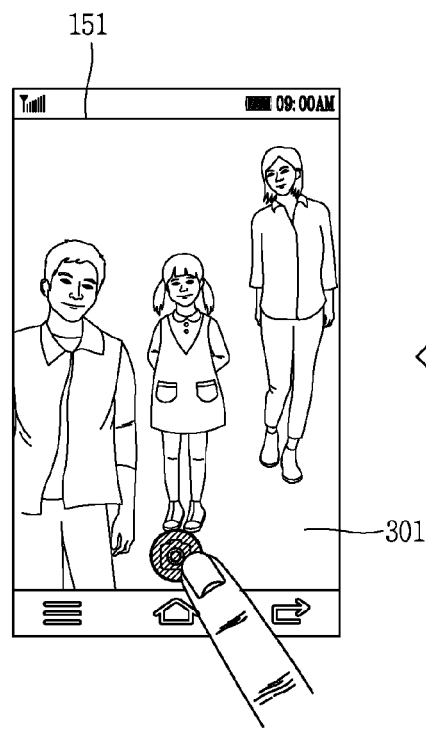
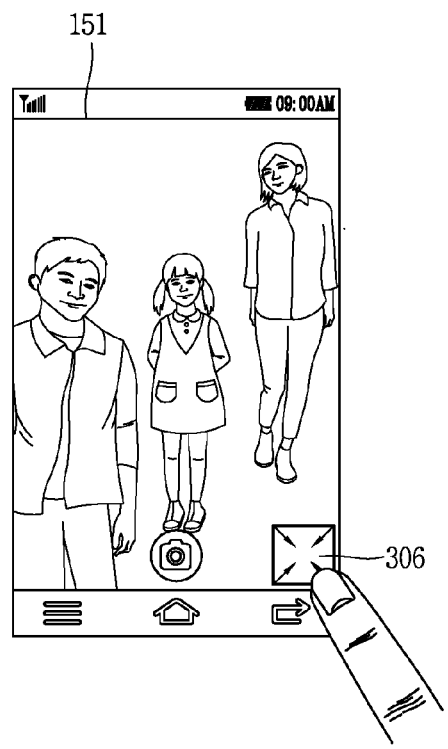

MOBILE TERMINAL AND METHOD OF CONTROLLING THE SAME

CROSS-REFERENCE TO RELATED APPLICATION

Pursuant to 35 U.S.C. §119(a), this application claims the benefit of earlier filing date and right of priority to Korean Patent Application No. 10-2015-0063245, filed on May 6, 2015, the contents of which is incorporated by reference herein in its entirety.

BACKGROUND OF THE DISCLOSURE

1. Field of the Disclosure

The present disclosure relates to a mobile terminal for performing a function of correcting a captured image.

2. Background of the Disclosure

Examples of mobile terminals include all devices that each include a battery and a display unit, display information on a screen of the display unit by using power supplied from the battery, and are portable by users. Also, examples of the mobile terminals include devices that record and reproduce video, devices that display a graphic user interface (GUI), etc. Also, examples of the mobile terminals include notebook computers, portable phones, glasses and watches that display screen information, game machines, etc.

As functions of the mobile terminals are being diversified, the mobile terminals are implemented as multimedia players having complex functions such as a function of taking a picture, a function of shooting video, a function of reproducing music or video, a function of playing a game, a function of receiving broadcast, etc. In order to support and increase the functions of the mobile terminals, it is required to improve structures and/or software of the mobile terminals.

A camera is equipped in the mobile terminals, and various functions of using an image captured by the camera are being developed. Various subjects may be imaged by using a front camera and a rear camera of a mobile terminal. Recently, as the photographing quality of the camera equipped in the mobile terminals is enhanced, a sharper image is provided. However, in a case of photographing a stereoscopic object, an image is distorted in an edge region of the image.

SUMMARY OF THE DISCLOSURE

Therefore, an aspect of the detailed description is to provide a mobile terminal and a method of controlling the same, which provide a captured image where perspective distortion that occurs when a three-dimensional (3D) subject is imaged to a two-dimensional (2D) subject has been corrected.

To achieve these and other advantages and in accordance with the purpose of this specification, as embodied and broadly described herein, a mobile terminal including: a camera configured to photograph an external environment; a display unit configured to display an image captured by the camera; and a control unit configured to extract, from the image, at least one object corresponding to a face in the external environment and control the display unit to correct the image by modifying a certain region of the at least one object, based on a distance from a center of the image to the at least one object.

In an exemplary embodiment of the present invention, a degree to which a certain region of the object is modified may increase as the certain region becomes farther away from the center of the image, and a degree of the modification may be determined based on a correction coefficient corresponding to a coordinate point of the object. Accordingly, only a region corresponding to a face may be modified and may be corrected based on a coordinate point, thereby providing an image which is substantially the same as a subject.

In an exemplary embodiment of the present invention, when a plurality of objects corresponding to a face are extracted, only an object selected by a user may be corrected, or an image may be corrected with respect to a selected correction coefficient set, based on a distance to a subject corresponding to the selected object. Accordingly, an object which is considered as an important object by the user is more accurately corrected.

In an exemplary embodiment of the present invention, a compensation image or an additional correction image which does not include a non-output region or includes a virtual image displayed on the non-output region may be provided.

In an exemplary embodiment of the present invention, a face included in an image may be extracted, and a certain region of an object corresponding to the face may be corrected based on a distance from a center of the image. Therefore, a face of a person is more accurately imaged, and only a region which is distorted may be selectively corrected, thereby minimizing the incidence of modification of the image.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 2A is a flowchart for describing a method of controlling a mobile terminal according to an exemplary embodiment of the present invention;

FIG. 3 is a flowchart for describing a control method of performing correction based on a stored correction coefficient;

FIGS. 7B and 7C are conceptual diagrams for describing a control method of selectively applying a correction coefficient set;

FIG. 10 is a conceptual diagram for describing a control method of correcting an image on a preview screen.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
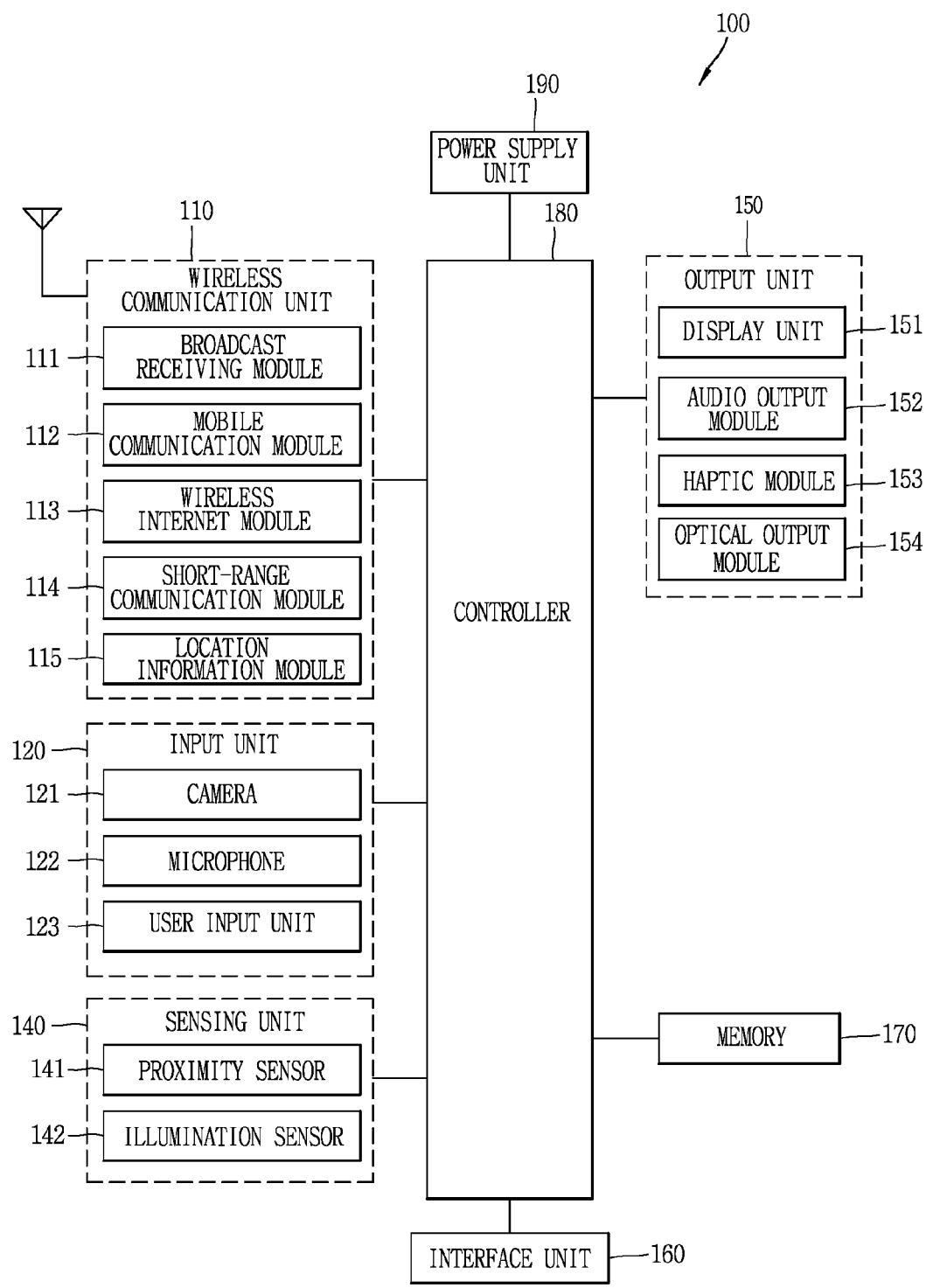
FIG. 1A is a block diagram for describing a mobile terminal according to an exemplary embodiment of the present invention.
Figure 1B:
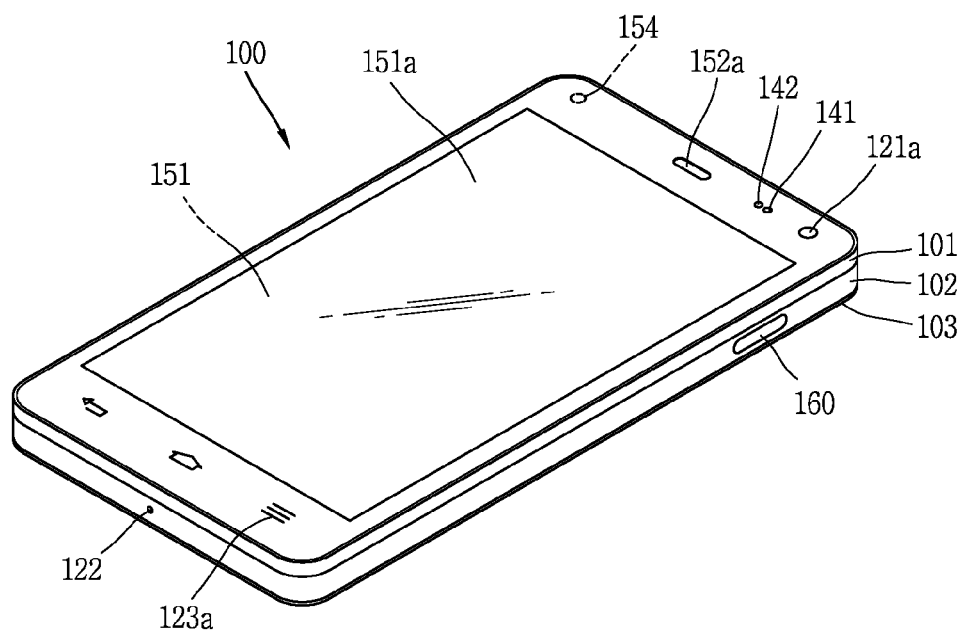
FIGS. 1B and 1C are diagrams illustrating a mobile terminal according to an exemplary embodiment of the present invention as seen in different directions
Figure 1C:
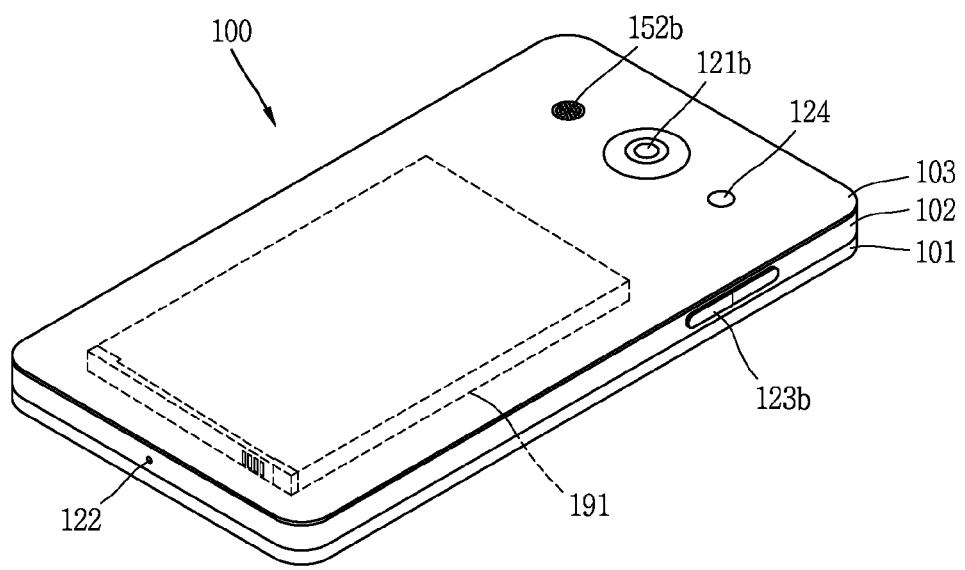

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 10, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 10 depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A mobile terminal according to an exemplary embodiment of the present invention may perform a function of correcting a subject photographed by the camera 121. Hereinafter, a control method of correcting an image captured by the camera 121 will be described in detail.

Figure 2B:
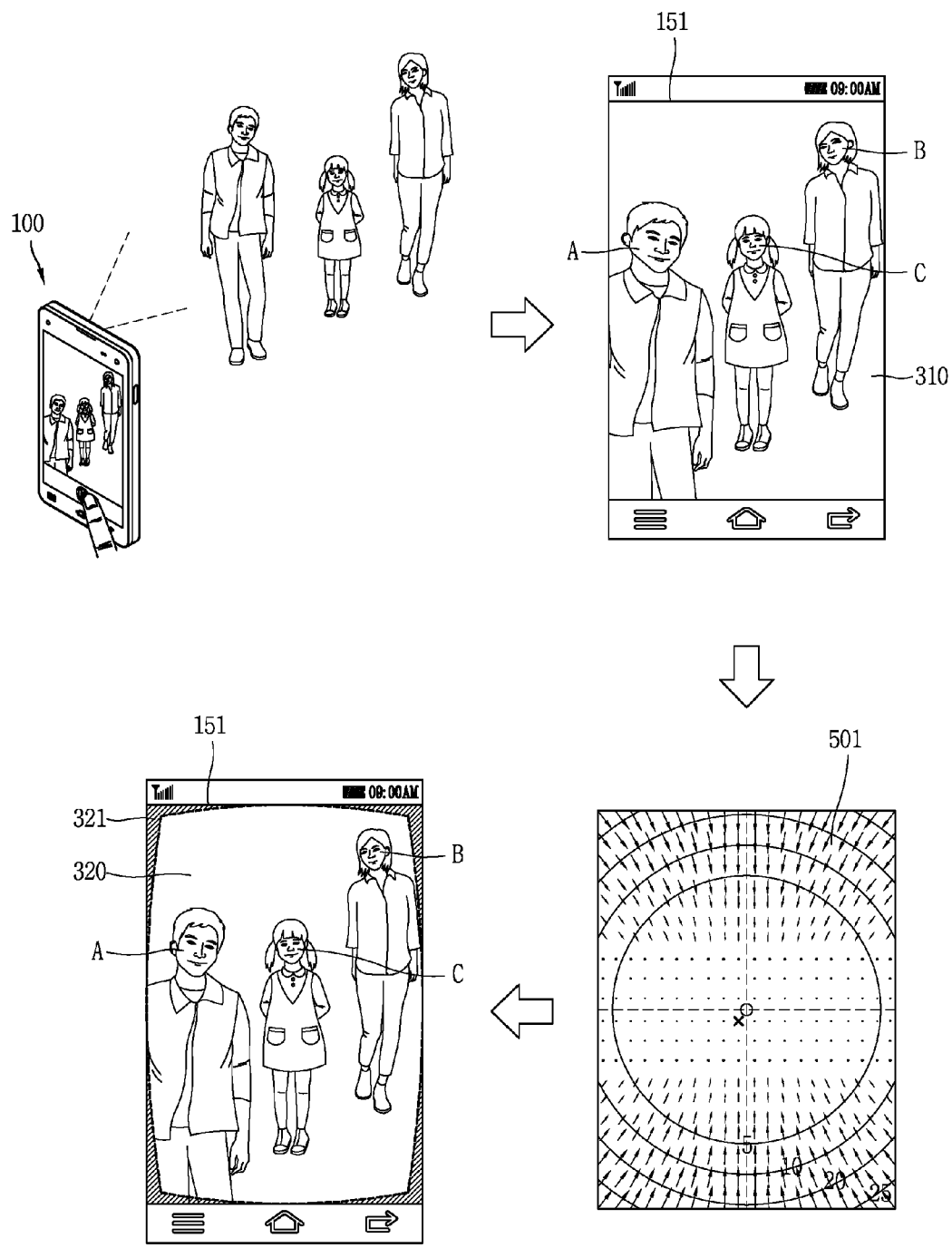
FIG. 2B is a conceptual diagram for describing the control method illustrated in FIG. 2A.

FIG. 2A is a flowchart for describing a method of controlling a mobile terminal 100 according to an exemplary embodiment of the present invention, and FIG. 2B is a conceptual diagram for describing the control method illustrated in FIG. 2A.

Referring to FIGS. 2A and 2B, in operation S2110, the camera 121 may photograph an external environment. Here, the camera 121 may be one of the front camera 121a and the rear camera 121b. The external environment may denote the outside of a body of the mobile terminal 100. The external environment may be a region sensed within a specific view angle of the camera 121 and may not be limited. A person may be included in the external environment and may be included in the external environment regardless of a size in which the person is photographed and a distance from the camera 121 to the person which is a subject.

Moreover, three persons are illustrated in FIG. 2B, but the number of persons which are subjects is not limited. An interval between a plurality of subjects is irrelevant to the external environment.

In operation S2120, the display unit 151 may display an image 310 captured by the camera 121. The captured image 310 may be displayed immediately after being captured the camera 121, but the present embodiment is not limited thereto. For example, an image file stored in the memory 170 may be activated based on a control command of a user.

In operation S2130, an object corresponding to a face may be extracted from the image 310. Here, the face may correspond to a face of a person, but an object which is to be extracted may be changed based on a setting by the user. However, the object to be extracted may correspond to a subject having a stereoscopic figure instead of a planar figure.

Moreover, a range of the object to be extracted may not be limited. For example, the object may correspond to a figure which includes a body of a person as well as a face of a person.

According to an exemplary embodiment of the present invention, the control unit 180 may perform a face recognition function when a photographing function is performed by the camera 121 or a stored image is displayed by the display unit 151. The face recognition function may detect a face from the image 310, based on standardized face figure information. The face figure information may include brightness, a geometric feature, etc. The display unit 151 may display an object corresponding to the face included in the image 310.

Figure 2C:
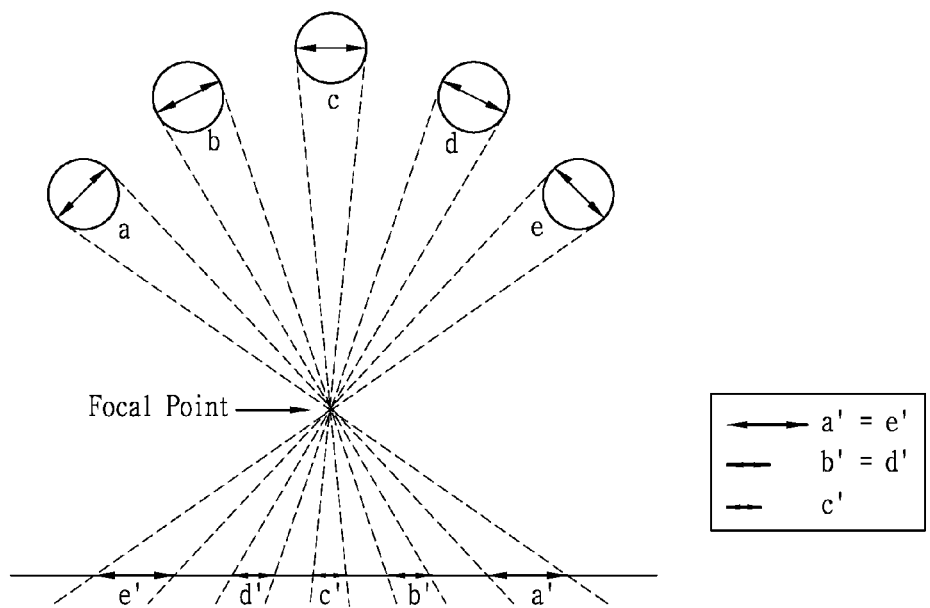
FIG. 2C is a conceptual diagram for describing perspective distortion.

FIG. 2C is a conceptual diagram for describing perspective distortion. Referring to FIG. 2C, the perspective distortion occurs when a 3D figure is being two-dimensionally projected. A 3D object which is generated at an edge of a captured image may be the most severely distorted. In FIG. 2B, an object B farthest away from a center of the image 310 may be the most severely distorted. For example, the object B may be imaged as a figure where a certain region of a face of a person is abnormally enlarged. An object C closest to the center may hardly be distorted and thus may be imaged as a figure which is almost similar to an actual figure.

In operation S2140, the object may be modified based on a distance from an original point O of the image 310 to the object. The control unit 180 may set the center of the image 310 to the original point O and may detect coordinates of the object from the image 310. The image 310 may be composed of a plurality of pixels, and coordinates included in the image 310 may correspond to each of the plurality of pixels.

The extracted object may be composed of a plurality of pixels, and thus, one object may include a plurality of coordinates. The control unit 180 may move a position, at which visual information of a pixel based on a distance between a coordinate point corresponding to the object and the original point O is displayed, toward the original point O in the display unit 151.

Referring again to FIG. 2B, the display unit 151 may display a first correction guide 501 including a plurality of circles which have the center of the image 310 as the original point O. The first correction guide 501 may be displayed to overlap the image 310. The first correction guide 501 may be displayed for a predetermined time (for example, several seconds). For example, the first correction guide 501 may be displayed while the control unit 180 is performing the correction.

Each of a plurality of coordinate points constituting the image 310 may have a correction coefficient based on the first correction guide 501. The correction coefficient may be defined based on the camera 121. It is assumed that a distance between a subject and a camera is constant, and when a distance from the original point O to the coordinate point is constant, the correction coefficient may be substantially the same as a correction coefficient of each of the plurality of coordinate points. That is, in the drawing, correction coefficients of coordinate points which are generated on one circular guideline may be substantially the same.

A plurality of coordinate points including one extracted object may have different coefficients. Also, a plurality of objects may be corrected to the different degrees of correction based on different correction coefficients according to a distance from the original point O.

Moreover, the correction coefficients may substantially increase as the distance increases, and thus, a degree of correction may increase as the distance increases. In this case, a coordinate point far away from the original point O may be controlled to more move toward the center than a coordinate point close to the original point O. However, the correction coefficients may be determined based on a function and a driving condition of the camera 121, and thus, the present embodiment is not limited thereto.

For example, the correction may be performed as expressed in Equations (1) and (2):

$$x\text{corrected} = x(1 + R_1 r^2 + R_2 r^4 + R_3 r^6) \quad (1)$$

$$y\text{corrected} = y(1 + R_1 r^2 + R_2 r^4 + R_3 r^6) \quad (2)$$

where $R_1$, $R_2$, and $R_3$ denote correction coefficients corresponding to a plurality of coordinate points, respectively.

In operation S2150, the display unit 151 may display a correction image 320 based on modification of the object. The correction image 320 may include a non-output region 321. Equations (1) and (2) and the correction based on the correction coefficient may be executed by a method where a piece of an image displayed on each of a plurality of pixels moves toward the original point O. Therefore, a non-output region 321 on which any image is not displayed may be provided in a portion of an edge region of the display unit 151, based on the movement of the piece of the image displayed on each pixel.

Any image may not be displayed on the non-output region 321, which may be darkly displayed. A shape of the non-output region 321 may be determined based on a position of the object which is to be corrected, and may be changed depending on a correction state.

The correction image 320 may have a shape similar to that of a subject corresponding to the object. For example, an object corresponding to a face of the object B which is stretched in a direction toward a corner of the display unit 151 may be corrected to a relatively circular shape.

According to an exemplary embodiment of the present invention, the incidence of modification of a different region is minimized by correcting only an object included in an image. Also, correction may be performed to the different degrees of correction, based on a distance from a center of the image to an object corresponding to a person, and thus, appropriate correction may be performed depending on a degree of distortion.

The mobile terminal 100 may perform wireless communication with a predetermined external device or server and may transmit a captured image. For example, the external device (or the server) receiving the image may correct the received image, and may store an image obtained through the correction or may transmit the obtained image to the mobile terminal 100 in real time.

For example, when the image is captured, the control unit 180 may transmit the captured image to the external device (or the server) and may store only an original image in the memory 170. In this case, the wireless communication unit 110 may receive a correction image for which the correction operation has been performed, and the memory 170 may store the correction image separately from the original image. In this case, the mobile terminal 100 may not perform an operation of correcting the image.

Therefore, the incidence of modification of an image is minimized, and a shape of a subject is more accurately imaged.

FIG. 3 is a flowchart for describing a control method of performing correction based on a stored correction coefficient.

In operation S2141, the control unit 180 may store a plurality of correction coefficients, respectively corresponding to a plurality of coordinates of an image captured by the camera 121, in the memory 170. The number of the correction coefficients may be substantially the same as the number of pixels constituting the image. A value of each of the plurality of correction coefficients may be changed based on a distance from the original point O. The memory 170 may store the plurality of correction coefficients along with a plurality of coordinate points.

In operation S2142, the control unit 180 may extract at least one coordinate point included in an object of the captured image. As the object increases in size, the number of coordinate points included in the object may increase. In operation S2143, the control unit 180 may modify the object by using a plurality of correction coefficients respectively corresponding to the plurality of coordinate points.

Therefore, even when the object occupies a large region of the display unit 151, the object may be modified based on a plurality of correction coefficients respectively corresponding to the plurality of coordinate points, thereby providing a correction image for which correction has been more precisely performed.

Figure 4A:
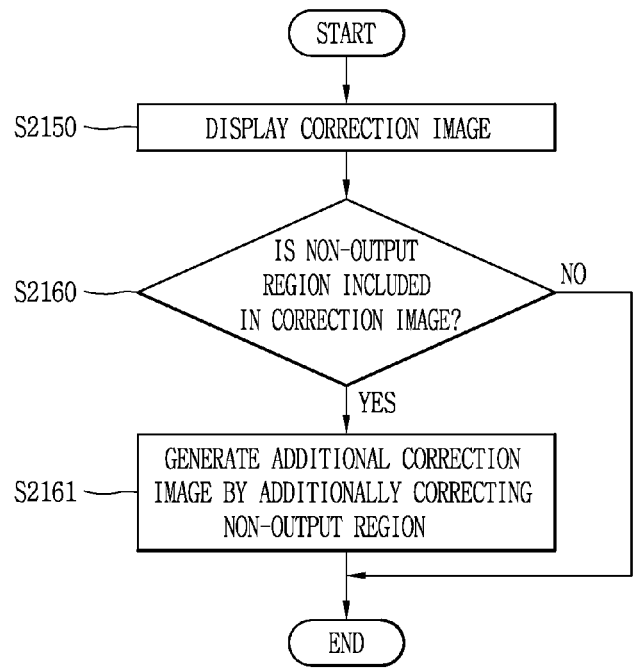
FIG. 4A is a flowchart for describing a control method of additionally correcting a correction image.
Figure 4B:
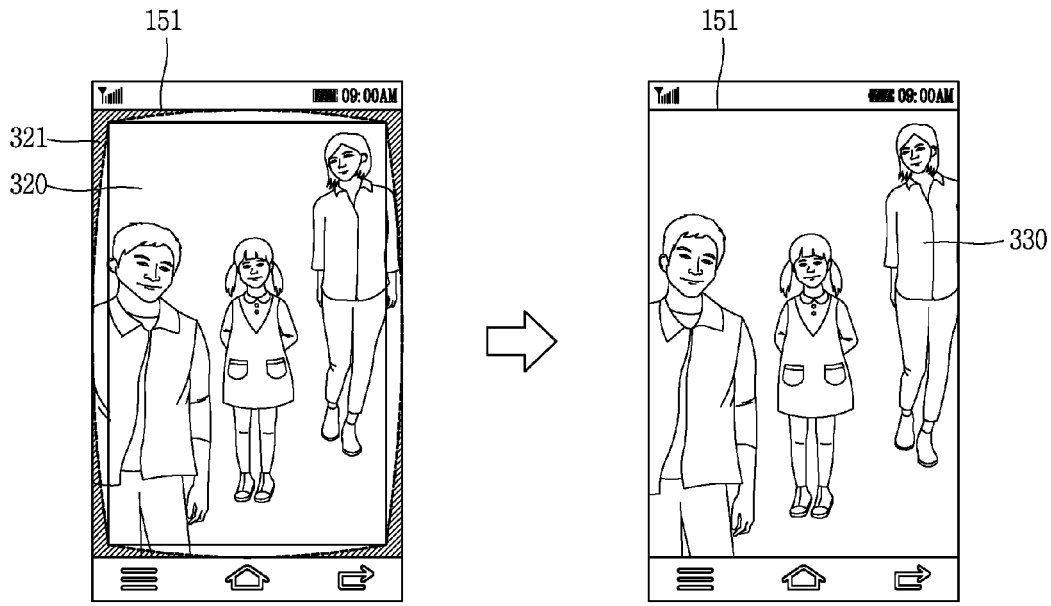
FIG. 4B is a conceptual diagram for describing the control method illustrated in FIG. 4A.

FIG. 4A is a flowchart for describing a control method of additionally correcting a correction image, and FIG. 4B is a conceptual diagram for describing the control method illustrated in FIG. 4A.

In operation S2150, the control unit 180 may display a correction image 320 on the display unit 151. The correction image 320 may include a non-output region 321 located in an edge region of the display unit 151.

In operation S2160, the control unit 180 may determine whether the non-output region 321 is included in the correction image 320. For example, when a rate at which the non-output region 321 occupies the correction image 320 is equal to or higher than a predetermined reference rate, the control unit 180 may determine the correction image 320 as including the non-output region 321. The reference rate may be set to a degree which enables a user to recognize the non-output region 321 with eyes.

When it is determined that the non-output region 321 is not included in the correction image 320, the display unit

151 may display the correction image 320 as-is. Also, the memory 170 may store the correction image 320 as-is.

When it is determined that the non-output region 321 is included in the correction image 320, the control unit 180 may generate an additional correction image 330 which is generated by correcting the non-output region 321, in operation S2161.

Referring to FIG. 4B, as a region becomes farther away from a center of an image, the incidence of modification of the region may become larger. A region corresponding to a coordinate point may be moved to the center of the image and may be corrected. Therefore, the non-output region 321 may be relatively broader in a region adjacent to a vertex of an edge of the display unit 151. Alternatively, when the object is located at an edge of the image, the edge may be modified to form a curved line. Therefore, a shape of an image itself captured by the camera 121 may be deformed.

Therefore, an additional correction image 330 having a tetragonal shape may be generated through correction of the correction image 320. The additional correction image 330 may include a region other than the non-output region 321. A size of the additional correction image 330 may be smaller than that of the image 310. That is, the additional correction image 330 may be generated by removing a portion of an edge region of the correction image 320 so as to form a tetragonal shape, and thus, a certain region included in the correction image 320 may be deleted. The additional correction image 330 may be enlarged and displayed in the display unit 151.

According to an exemplary embodiment of the present invention, since the non-output region 321 is not provided in the display unit 151 after correction, a high-quality image is provided to a user, and when a correction operation is performed without a control command of the user, the user may recognize an additional correction image as a captured original image.

Figure 5A:
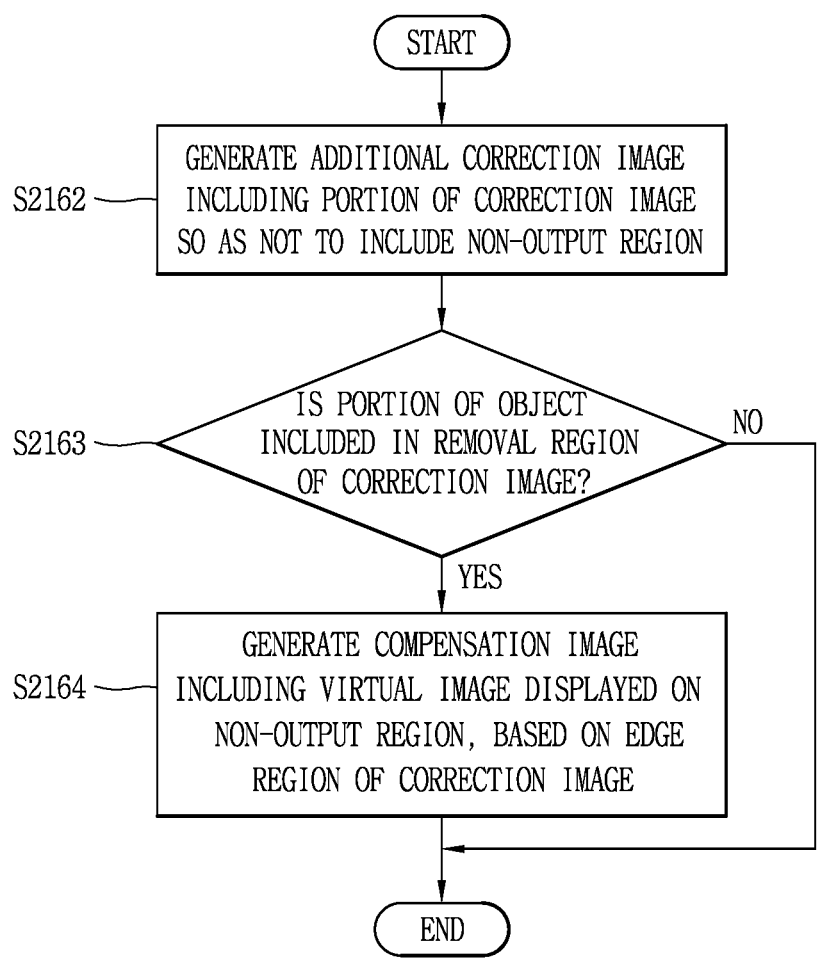
FIG. 5A is a flowchart for describing a control method of generating a compensation image, based on a state of an object included in an additional correction image.
Figure 5B:
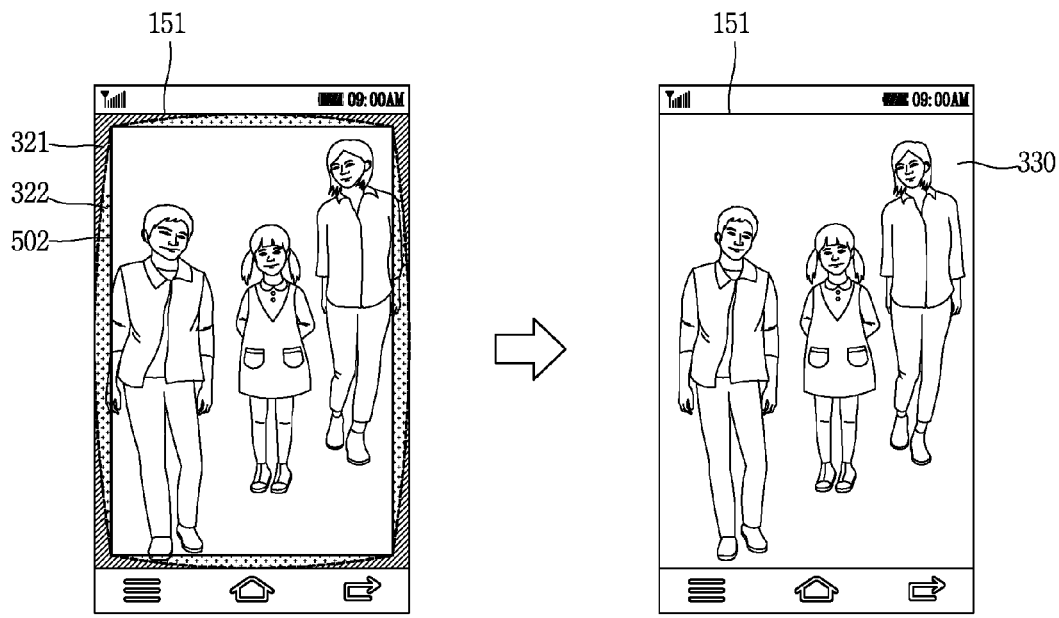
FIGS. 5B and 5C are conceptual diagrams for describing the control method illustrated in FIG. 5A.
Figure 5C:
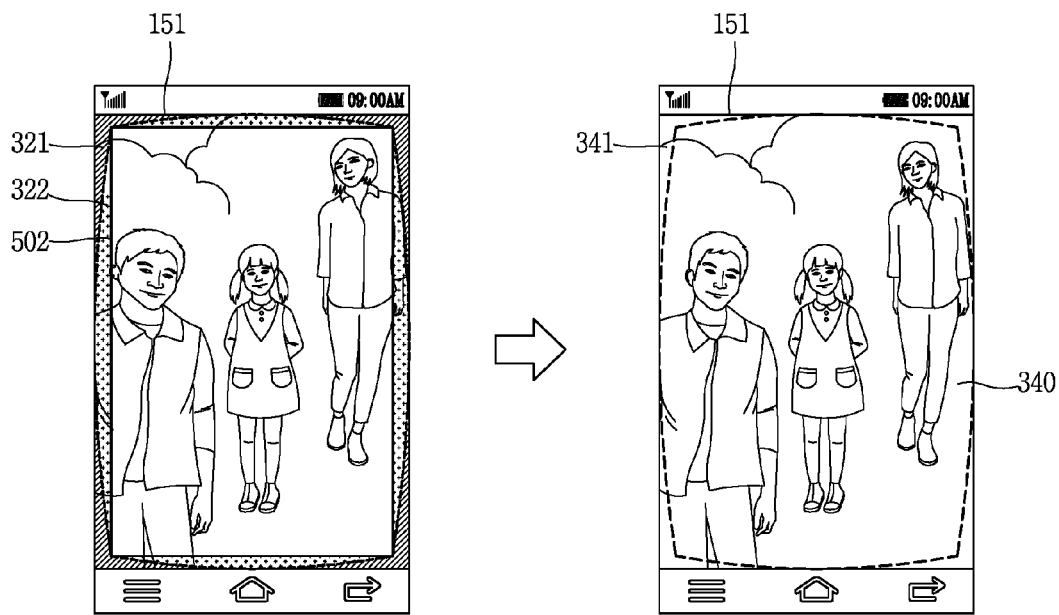

FIG. 5A is a flowchart for describing a control method of generating a compensation image, based on a state of an object included in an additional correction image, and FIGS. 5B and 5C are conceptual diagrams for describing the control method illustrated in FIG. 5A.

In operation S2162, when a correction image 320 including a non-output region 321 is generated, the control unit 180 may generate an additional correction image 330 including a portion of the correction image 320 so as not to include the non-output region 321. For example, the additional correction image 330 may have a tetragonal shape, and may include a maximum region other than the non-output region 321. Therefore, the correction image 320 which is not included in the additional correction image 330 may include a removal region 322. The additional correction image 330 may include a region other than the removal region 322 and non-output region 321 of the correction image 320.

A second correction guide 502 may be displayed along with the correction image 320. The second correction guide 502 may correspond to an edge of the additional correction image 330. Although not shown in detail, a user may apply a touch to the second correction guide 502 to control a size of the additional correction image 330. A width-to-height ratio of the additional correction image 330 may be substantially the same as a width-to-height ratio of the correction image 320. However, the width-to-height ratio of the additional correction image 330 may be changed by the second correction guide 502.

In operation S2163, the control unit 180 may determine whether the removal region 322 includes a portion of an object. Referring to FIG. 5B, the correction image 320 may include a plurality of objects A to C, and the plurality of objects A to C included in the correction image 320 may be the same as a plurality of objects included in the additional correction image 330. That is, all the plurality of objects A to C may be included in the other region.

When the portion of the object is included in the removal region 322 of the correction image 320, a compensation image including a virtual image may be generated based on an edge region of the correction image 320 in operation S2164.

When the portion of the object is included in the removal region 322, a portion of a photographed object may be deleted by generating the additional correction image 320 in a region other than the removal region 322 of the correction image 320. When the second correction guide 502 is generated in a certain region of the plurality of objects A to C, the control unit 180 may not generate the additional correction image 320.

The control unit 180 may generate a compensation image 340 including a virtual image 341. The virtual image 341 may be displayed on the non-output region 321. The virtual image 341 may be generated by using an image displayed on an edge region of the display unit 151. The virtual image 341 may be generated by copying or modifying the displayed on the edge region.

A size of the compensation image 340 may be substantially the same as that of an image 310 captured by the camera 121 and a region may not be removed. Therefore, the user is provided with an image where an object of a captured subject is not damaged.

Referring to FIGS. 5B and 5C, when the captured image 310 is corrected, the display unit 151 may display the correction image 320 along with the second correction guide 502. The user may apply a touch to the second correction guide 502 to determine whether to perform additional correction or to define a region which is to be additionally corrected. In FIG. 5C, the control unit 180 may perform additional correction for removing a portion of the object, based on the touch applied to the second correction guide 502.

However, the display unit 151 may not separately display the correction image 320 including the non-output region 321 and may immediately display the addition correction image 330 or the compensation image 340.

The memory 170 may store one or more of the image 310, the correction image 320, the additional correction image 330, and the compensation image 340 in order for the one or more images to mapped to each other.

According to an exemplary embodiment of the present invention, a user is provided with an image which is obtained by performing correction so that an object corresponding to a face of a person is included in an image and is not removed, and the image does not include a non-output region. An image where a damage of a photographed object is minimized is provided.

Figure 6A:
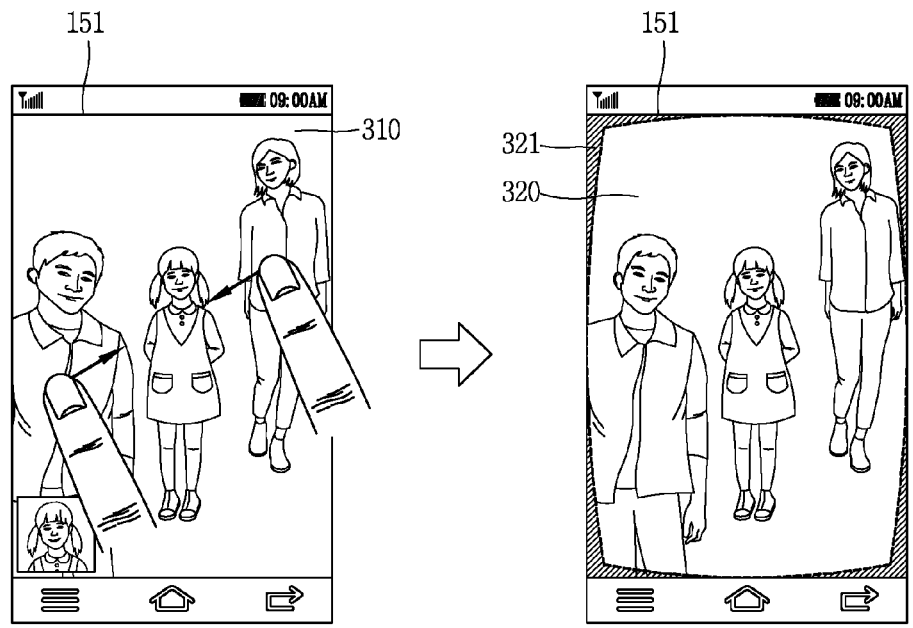
FIGS. 6A to 6C are conceptual diagrams for describing a control method of selectively correcting an image.
Figure 6B:
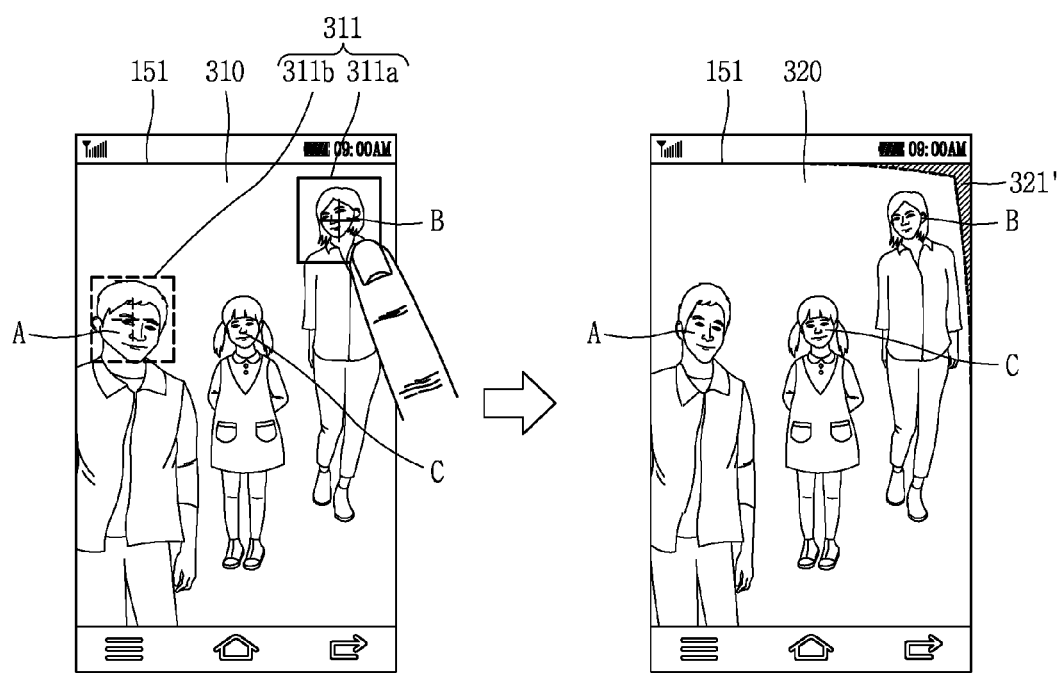
Figure 6C:
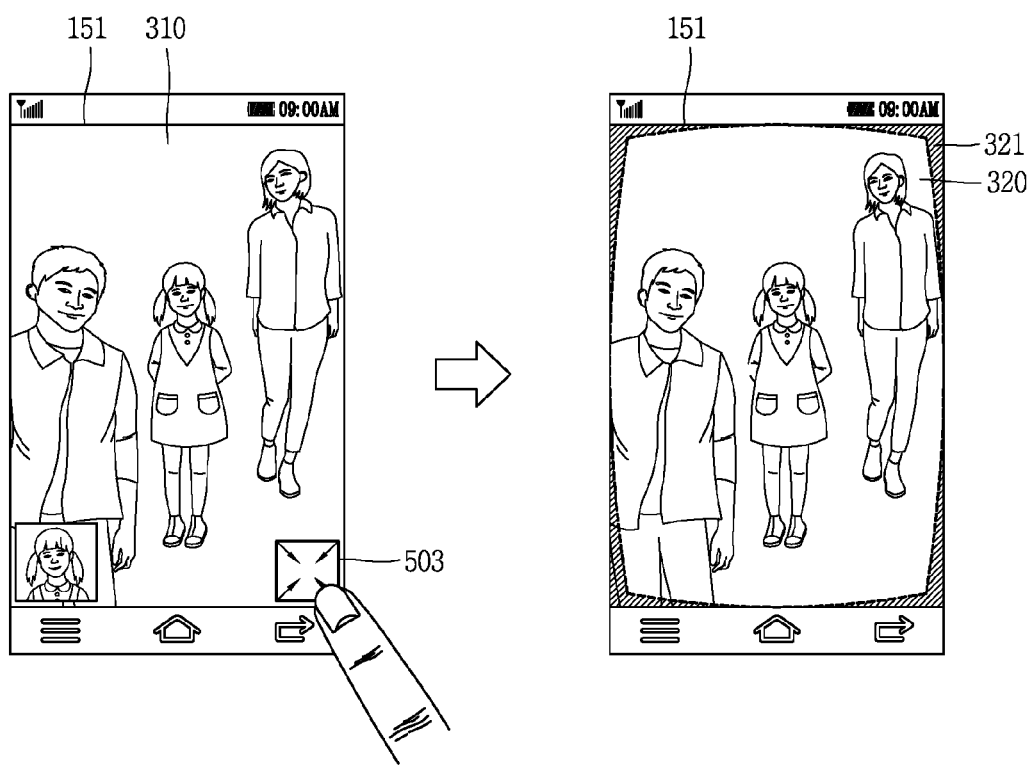

FIGS. 6A to 6C are conceptual diagrams for describing a control method of selectively correcting an image.

Referring to FIG. 6A, the display unit 151 may receive a touch while displaying the image 310. The control unit 180 may perform a function of correcting the image 310, based on a specific touch applied to the image 310. For example, the specific touch may be a pinch-in type touch input, but is not limited thereto. When the specific touch is applied to the image 310, the control unit 180 may extract an object which is included in the image 310 and corresponds to a face of a person, and may correct the object, based on a distance from a center of the image 310.

The display unit 151 may display the correction image 320, based on the touch. When an object is included in the image 310, the non-output region 321 may be displayed with respect to an edge of the display unit 151, based on the touch. Although not shown in the drawing, when a touch having a type different from that of the specific touch is applied to the image 310, the display unit 151 may again change the correction image 320 to the image 310.

According to an exemplary embodiment of the present invention, since an image is corrected according to a control command of a user, a user may be provided with a pre-correction image and a post-correction image and may compare the pre-correction image with the post-correction image.

Referring to FIG. 6B, when the image 310 is generated by the camera 121 or is output by the user, the control unit 180 may extract an object, corresponding to a face of a person, from the image 310. When one or more objects are extracted, the display unit 151 may display a selection image 311.

The selection image 311 may be generated to show each of the extracted objects. For example, the selection image 311 may be displayed to surround an object.

The control unit 180 may control the display unit 151 to selectively display the selection image 311 on an object, which is to be modified through correction, among the extracted objects. Referring to FIG. 6B, a third object C displayed adjacent to a center of the image 310 among extracted first to third objects A to C may hardly be modified in shape when there is no correction coefficient or the correction coefficient is applied. In this case, the selection image 311 may not be displayed on the third object C.

The control unit 180 may determine whether to display a graphic image, based on coordinates of an extracted object (and a correction coefficient corresponding to the coordinates). The display unit 151 may display a first election image 311a and a second selection image 311b on the first object A and the second object B which are capable of being modified based on the correction coefficient.

The display unit 151 may receive a touch applied to the first election image 311a and the second selection image 311b and may ignore a touch applied to a region other than the first election image 311a and the second selection image 311b. Alternatively, the control unit 180 may perform control to perform another function according to the touch applied to a region other than the first election image 311a and the second selection image 311b.

The control unit 180 may correct at least one of the first object A and the second object B, based on a touch applied to at least one of the selection image 311a and the selection image 311b. The control unit 180 may correct the second object B, based on a touch applied to the second selection image 311b. The control unit 180 may not correct the first object A. Therefore, the display unit 151 may display a correction image 320 including an image of the second object B for which correction has been performed.

Moreover, a non-output region 321' may be provided in only a region adjacent to the second object B.

According to an exemplary embodiment of the present invention, the control unit 180 may inform a user of a correctable region and may modify only an object selected by the user, thereby generating a correction image based on an intention of the user.

Moreover, although not shown in the drawing, the display unit 151 may further display an indicator, indicating that the correction has been performed, on a region corresponding to the second object B for which the correction has been performed. Also, the control unit 180 may release the correction, based on a control command applied to the indicator.

Referring to FIG. 6C, when an image includes a correctable object, the display unit 151 may display a correction icon 503 along with the image 310. That is, when an object corresponding to a face of a person is included in the image 310 and a shape of the object is correctable, the control unit 180 may display the correction icon 503 in the display unit 151.

The control unit 180 may perform a correction function, based on a touch applied to the correction icon 503. When the correction function is performed, the display unit 151 may display a correction image 320 including the non-output region 321.

However, even when the object corresponding to the face of the person is not included in the image 310, the control unit 180 may display the correction icon 503 in the display unit 151. In this case, the control unit 180 may extract a region, corresponding to a 3D subject, from the image 310 and may correct the image 310 by using a correction coefficient of a coordinate point of the extracted region. That is, when the object is not included in the image 310, the control unit 180 may correct an image of a 3D subject included in the image 310.

According to an exemplary embodiment of the present invention, a user may check a captured image to determine whether to perform correction.

The correction coefficient may be differently set based on a distance to a subject. Hereinafter, a control method of generating images of subjects located at different distances from a camera will be described.

Figure 7A:
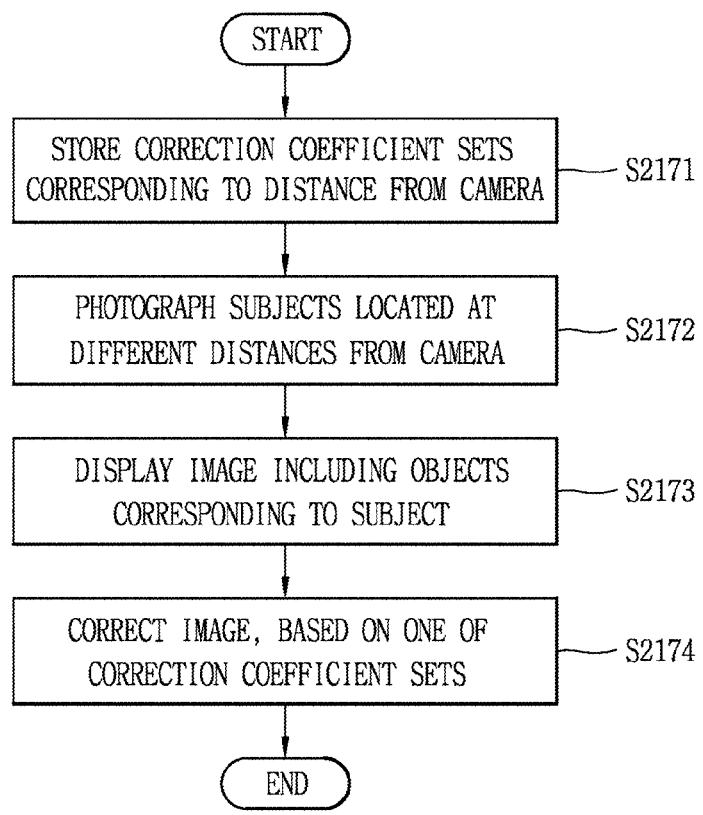
FIG. 7A is a flowchart for describing a control method of selectively applying a correction coefficient set, based on a distance to a subject.
Figure 7C:
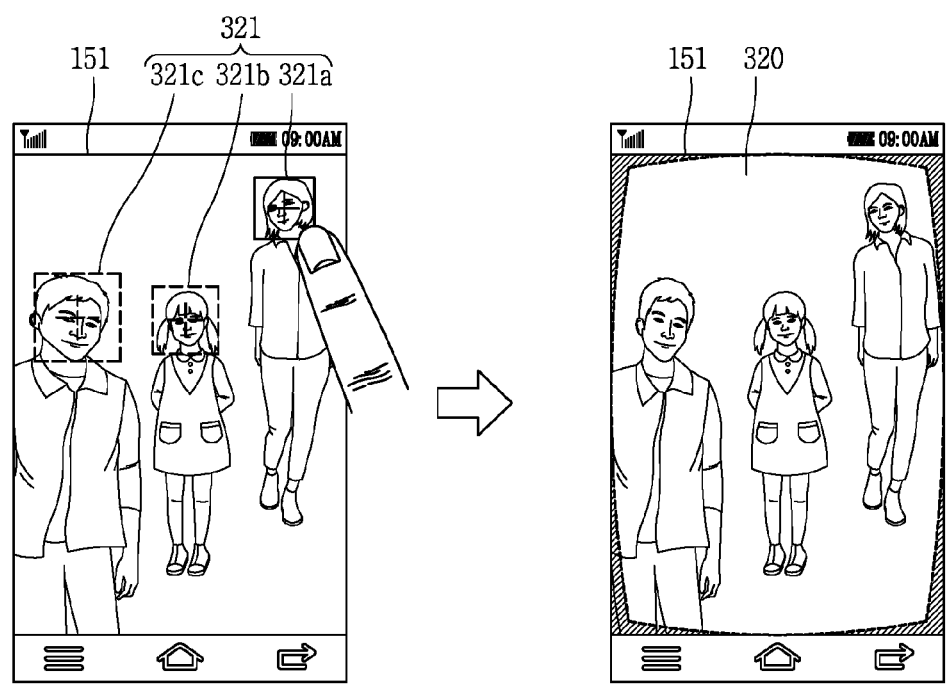

FIG. 7A is a flowchart for describing a control method of selectively applying a correction coefficient set, based on a distance to a subject. FIGS. 7B and 7C are conceptual diagrams for describing a control method of selectively applying a correction coefficient set.

In operation S2171, the memory 170 may store a plurality of correction coefficient sets corresponding to a distance from the camera 121. One correction coefficient set may include a plurality of correction coefficients corresponding to a pixel constituting the display unit 151. The plurality of correction coefficient sets may respectively correspond to a plurality of reference distances which are spaced apart from each other at predetermined intervals. Even in a case where objects of the substantially same subjects are displayed at the same position in the display unit 151, when distances between the subjects and the camera 121 differ, correction may be performed by using different correction coefficients.

When the camera 121 photographs subjects located at different distances in operation S2172, the control unit 180 may display an image, including a plurality of objects corresponding to each of the subjects in operation S2173.

Referring to FIG. 7B, first to third subjects a to c may be located to be spaced apart from the camera 121 by first to third distances d1 to d3, respectively. The control unit 180 may correct the first to third objects A to C by using coordinate points of the first to third objects A to C and correction coefficients respectively corresponding to the first to third distances d1 to d3, respectively. That is, in operation S2174, the control unit 180 may correct the image, based on one of the plurality of correction coefficient sets.

However, the present embodiment is not limited thereto. In other embodiments, the control unit 180 may correct all the objects included in the image by using a correction coefficient set corresponding to an average distance of distances to the subjects. The control unit 180 may perform a correction function by using a correction coefficient which is included in the correction coefficient set corresponding to the average distance and corresponds to coordinate points of the objects.

When an average value of the first to third distances d1 to d3 corresponds to the second distance d2, the control unit 180 may select a correction coefficient set corresponding to the second distance d2. The control unit 180 may select correction coefficients respectively corresponding to coordinate points of the first to third objects A to C and may extract the first to third objects A to C.

However, the plurality of correction coefficient sets may include a representative correction coefficient set which is used to perform correction of all coordinate points within a predetermined error range, the control unit 180 may perform all correction functions by using the representative correction coefficient set.

FIG. 7C is a conceptual diagram for describing a control method of selecting a correction coefficient set, based on a selected object.

When an image 310 is displayed, the control unit 180 may extract an object, corresponding to a face of a person, from the image 310 and may analyze a position of a subject corresponding to the extracted object. When it is determined that an object corresponding to a subject is included in the image 310, the control unit 180 may detect a distance between the subject and the camera 121. When distances between the subjects and the camera 121 differ, the control unit 180 may control the display unit 151 to display a selection image 312. The display unit 151 may mark the selection image 312 on each of objects respectively corresponding to subjects located at different distances. As illustrated in FIG. 7C, the display unit 151 may display first to third selection images 312a, 312b and 312c.

Although not shown in detail in the drawing, the first to third selection images 312a, 312b and 312c may be displayed to be distinguished from each other. For example, the first to third selection images 312a, 312b and 312c may be displayed to have different colors.

When a plurality of objects are generated based on subjects located at the substantially same position, selection images marked on objects of the subjects located at the same position may be displayed to have different colors.

The control unit 180 may select one object, based on a touch applied to the selection images and may select one correction coefficient set from among the plurality of correction coefficient sets, based on a distance between a subject of the selected object and the camera 121. The control unit 180 may correct the other objects, based on the correction coefficient set selected from the selection images.

When a correction image is displayed based on the selected correction coefficient set, the control unit 180 may continuously mark the selection image 312 on the correction image in the display unit 151. When a touch is again applied to the selected selection image, the control unit 180 may again display the image 310 in the display unit 151. In this case, the image 310 may be displayed along with the first to third selection images 312a, 312b and 312c.

According to an exemplary embodiment of the present invention, the mobile terminal 100 may select a correction coefficient set from among a plurality of correction coefficient sets located at different distances, based on an object selected by a user. Therefore, the mobile terminal 100 may more accurately correct an object which is considered as an important object by the user.

Figure 8A:
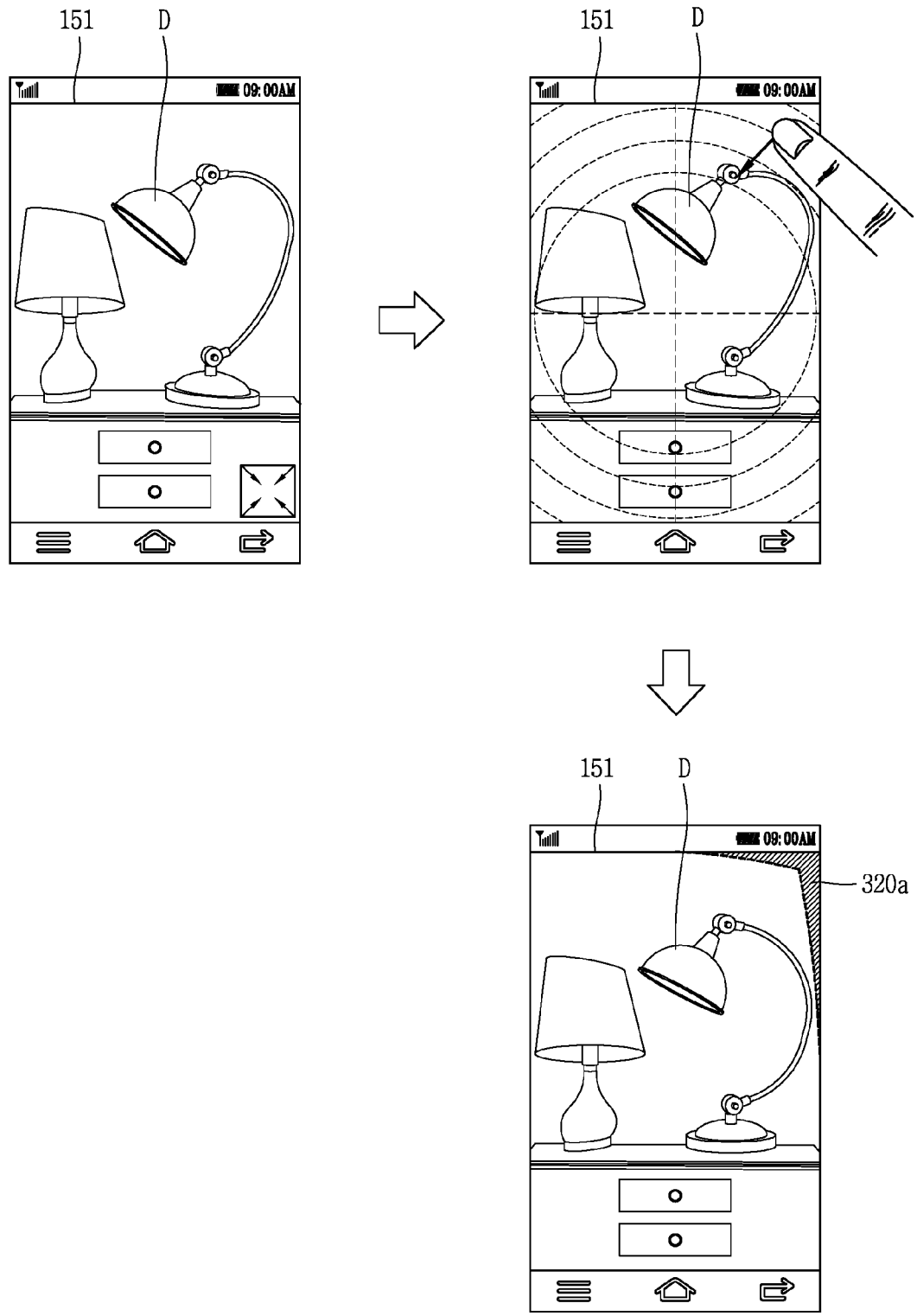
FIG. 8A is a conceptual diagram for describing a method of correcting an image including no face of a person.

FIG. 8A is a conceptual diagram for describing a method of correcting an image including no face of a person.

Referring to FIG. 2C, when a 3D subject is photographed as a 2D image, a shape of the 3D subject may be distorted. Hereinabove, it has been described that the mobile terminal 100 extracts an object corresponding to a face of a person, but in the present embodiment, the control unit 180 may extract an object of the shape-distorted 3D subject. For example, as illustrated in the drawing, an object D may correspond to illumination of which a shape is modified.

When an object corresponding to a person is not included in the image 310, the control unit 180 may display the image 310 in the display unit 151 as-is. However, the control unit 180 may extract an object which has been distorted and imaged, and may correct at least one region of the extracted object, based on a distance from a center of the image 310 (in detail, based on a correction coefficient corresponding to a coordinate point constituting the extracted object).

The display unit 151 may receive a user touch input when the object is extracted. The control unit 180 may correct the object, based on the user touch input. When a plurality of objects are included in the image 310, the user may selectively correct an object by applying a touch input to the display unit 151. The display unit 151 may display an image which includes a non-output region 320a and is obtained through correction.

According to an exemplary embodiment of the present invention, a user may be provided with a correction image which is obtained by correcting an object other than a face of a person, based on a touch.

Figure 8B:
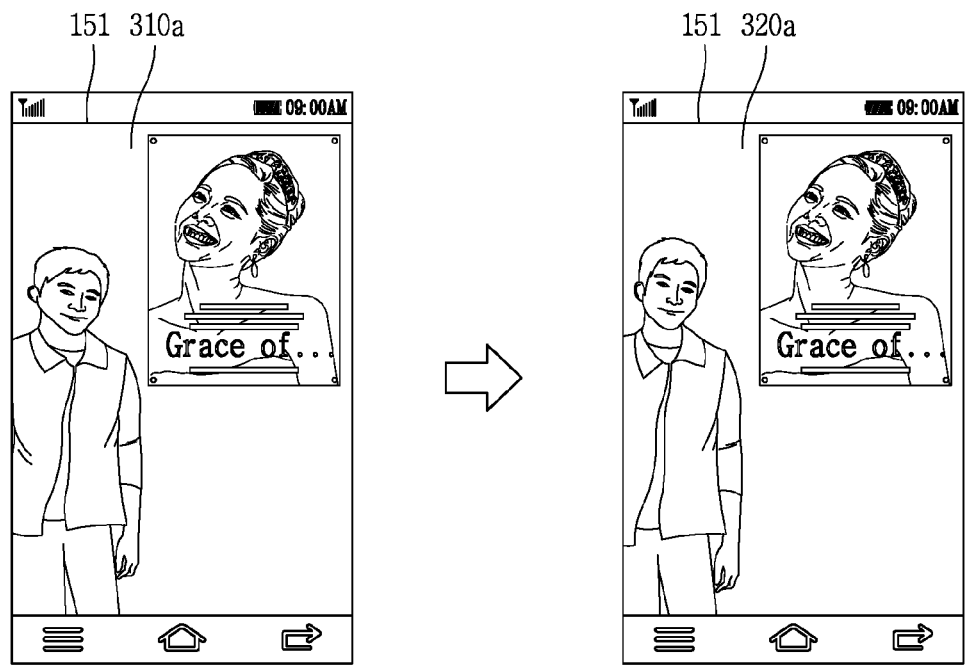
FIG. 8B is a conceptual diagram for describing a control method when an object corresponds to a planar subject.

FIG. 8B is a conceptual diagram for describing a control method when an object corresponds to a planar subject. The control unit 180 may determine whether a subject of an object corresponding to a face has a 3D shape. When the object corresponding to the face corresponds to a planar image, the control unit 180 may restrict modification of the object.

For example, when a photograph or an image (for example, a movie poster and/or the like) including a face of a person is captured by the camera 121, the photograph or the image may be imaged not to be distorted although including the face of the person. That is, even in a case where an image is recognized as a face of a person, when a subject corresponding to the image is sensed as a plane, the control unit 180 may control the display unit 151 to display the image as-is.

Figure 9A:
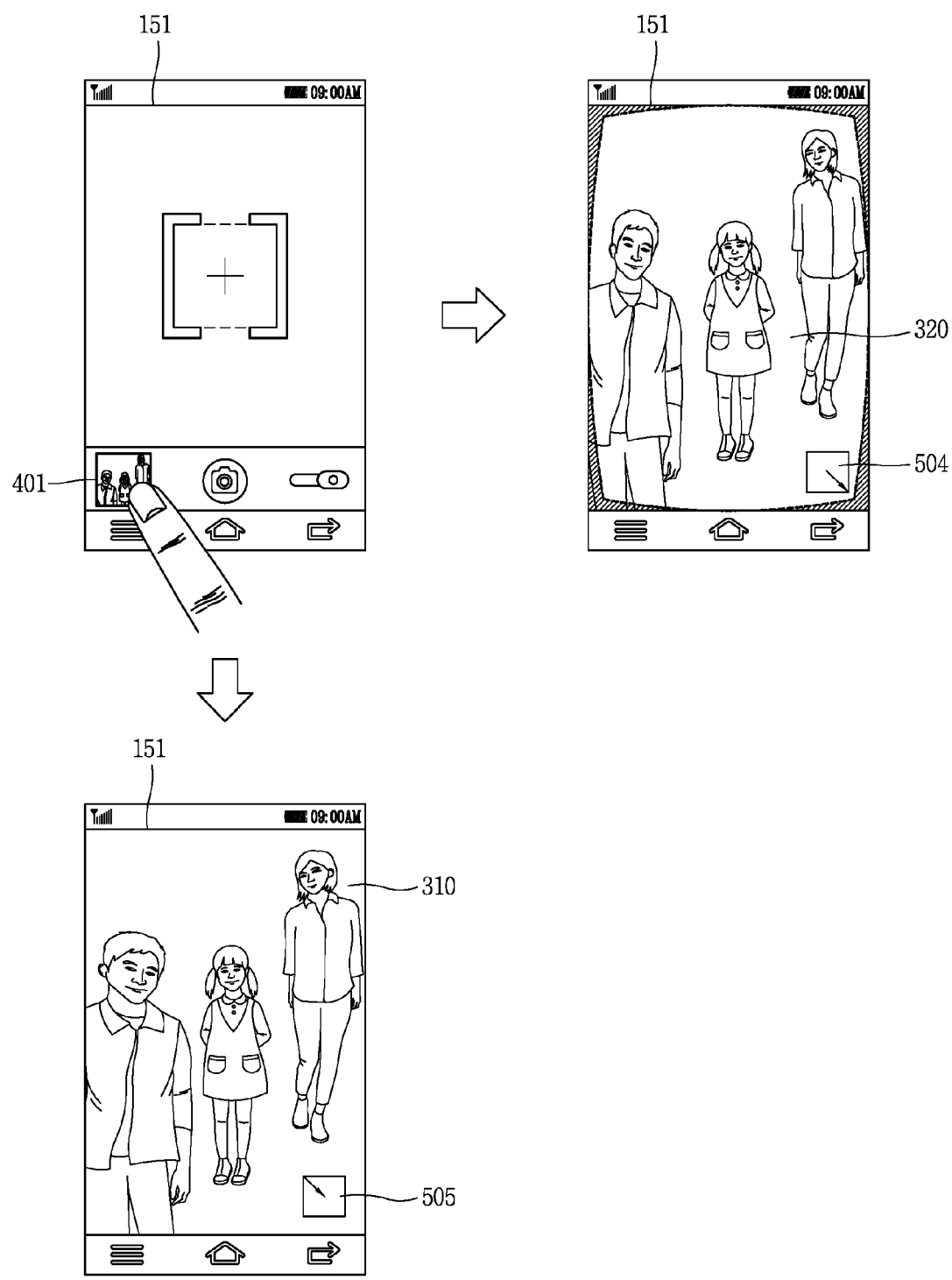
FIGS. 9A to 9C are conceptual diagrams for describing a control method for a correction image.
Figure 9B:
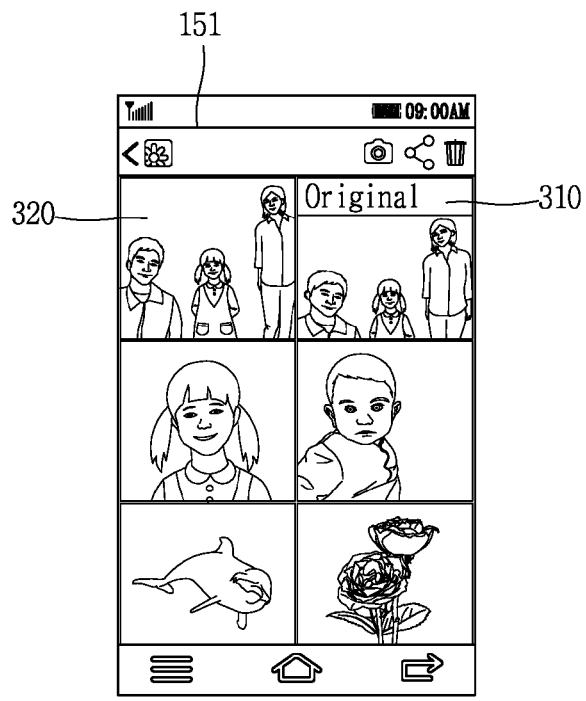
Figure 9C:
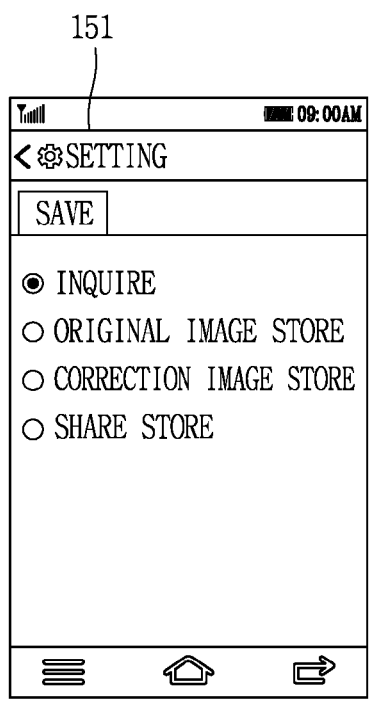

FIGS. 9A to 9C are conceptual diagrams for describing a control method for a correction image.

Referring to FIG. 9A, when the camera 121 is activated, the display unit 151 may display an icon 401 of a recently captured image. The display unit 151 may display a corrected image 320, based on a touch input applied to the icon 401. An image marked on the icon 401 may include a pre-correction image. A recovery icon 504 may be marked on the corrected image 320. When a touch is applied to the recovery icon 504, the control unit 180 may control the display unit 151 to display the pre-correction image.

The control unit 180 may control the display unit 151 to display the pre-correction image 310, based on a touch applied to the icon 401. A correction icon 505 may be marked on the image 310. The correction icon 505 may include a shape different from that of the recovery icon 504. When a touch is applied to the recovery icon 504, the control unit 180 may correct and display the image 310.

According to an exemplary embodiment of the present invention, a user may be selectively provided with a pre-correction original image and a correction image, and even after the pre-correction original image or the correction image is displayed, the user may change the pre-correction original image or the correction image.

Referring to FIG. 9B, when an image is captured, the control unit 180 may control the memory 170 to store an original image and a correction image together. The memory 170 may store the original image and the correction image to be distinguished from each other. As illustrated in the drawing, the memory 170 may separately store a plurality of original images, which are captured and are divided into a plurality of folders, and a plurality of correction images respectively corresponding to the plurality of original images.

For example, when an original image is stored based on a control command of a user, the control unit 180 may control the memory 170 to store a correction image, corresponding to the original image, in a distinguished folder. Therefore, the user may be provided with a pre-correction image and a post-correction image without a separate control command.

FIG. 9C is a conceptual diagram illustrating screen information for a setting for storing an image. When an external environment is photographed by the camera 121, a user may set a method of storing a generated image.

For example, when an image is captured, the display unit 151 may display, to a user, a popup window for selecting a storage method. Alternatively, the control unit 180 may control the memory 170 to store at least one of an original image and a correction image.

FIG. 10 is a conceptual diagram for describing a control method of correcting an image on a preview screen.

When an external environment is photographed by the camera 121, the display unit 151 may display screen information about the photographed external environment. When a control command for photographing is applied to the display unit 151 (for example, a touch input is applied to a photographing icon) while the screen information is being displayed, an image may be generated based on the screen information. The image may be stored in the memory 170 or may be displayed in the display unit 151 according to the control command, based on a user setting.

According to an exemplary embodiment of the present invention, while the screen information is being displayed, a first icon (a correction icon) 306 may be displayed. The display unit 151 may display correction screen information 301, based on a touch applied to the correction icon 306. When the touch is applied to the correction icon 306 and the substantially same external environment is sensed by the camera 121 for a predetermined time t, the control unit 180 may display the correction screen information 301.

When a touch is applied to a photographing icon while the correction screen information 301 is being displayed, the correction screen information may be stored as an image. When the touch is applied to the correction icon 306 and then another external environment is sensed by the camera 121, the control unit 180 may release the correction and may display other screen information in the display unit 151.

Although not shown in detail in the drawing, based on different control commands, pre-correction screen information may be imaged, or post-correction screen information may be stored as an image.

According to an exemplary embodiment of the present invention, since a user is provided with a corrected preview image before an external environment is imaged, the user may be previously provided with a corrected state of an image and may perform imaging.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a camera;
a display; and
a controller configured to:
cause the display to display an image received via the camera;
extract, from the image, at least one object corresponding to a face; and
correct the image by modifying a certain region of the extracted at least one object based on a distance from a center of the image to the at least one object in the image.

2. The mobile terminal of claim 1, the controller is further configured to increase a degree of the modification as the certain region is moved farther away from the center in the image.

3. The mobile terminal of claim 2, wherein the controller is further configured to cause the display to display a first correction guide when the at least one object is extracted, the first correction guide including a plurality of circles which indicate the center of the image as an original point.

4. The mobile terminal of claim 1, wherein the controller is further configured to:
cause the display to display at least one selection image corresponding to the extracted at least one object; and
selectively modify the at least one object based on a touch applied to the at least one selection image.

5. The mobile terminal of claim 1, wherein the controller is further configured to cause the display to:
display the corrected image in response to a first touch applied to the image; and
re-display the image prior to the correction in response to a second touch applied to the corrected image.

6. The mobile terminal of claim 1, wherein:
the controller is further configured to cause the display to display:
- a correction image, which includes the at least one object of which the certain region has been modified; and
- a non-output region in which no visual information is included; and the non-output region is adjacent to the at least one object of which the certain region has been modified.

7. The mobile terminal of claim 6, wherein:
the controller is further configured to generate a second correction image that includes a certain region of the correction image, the second correction image not including the non-output region; and
a width-to-height ratio of the second correction image is same as a width-to-height ratio of the correction image.

8. The mobile terminal of claim 7, wherein the controller is further configured to:
cause the display to display a second correction guide for generating the second correction image when the non-output region is displayed; and
adjust a size of the second correction image when a touch is applied to the second correction guide.

9. The mobile terminal of claim 7, wherein:
the controller is further configured to determine whether at least one region of the extracted at least one object is included in a removal region that corresponds to an edge portion of the correction image, but not included in the second correction image; and
when the at least one region of the extracted at least one object is included in the removal region, the controller is further configured to generate a compensation image that includes a virtual image displayed on the non-output region.

10. The mobile terminal of claim 1, further comprising:
a memory configured to store a plurality of correction coefficient sets that are set based on a reference distance from the camera,
wherein each of the plurality of correction coefficient sets comprises a plurality of correction coefficients, each of the correction coefficients corresponding to a respective one of a plurality of coordinate points constituting a display screen of the display, and
the plurality of correction coefficient sets are used to correct an object corresponding to the plurality of coordinate points.

11. The mobile terminal of claim 10, wherein the controller is further configured to:
detect a distance from the camera to a subject of the extracted at least one object; and
select one correction coefficient set from among the plurality of correction coefficient sets based on the detected distance.

12. The mobile terminal of claim 11, wherein the controller is further configured to:
cause the display to display a plurality of selection images corresponding to the extracted at least one object when distances from the camera to each of a plurality of subjects of the extracted at least one object are different; and
select the one correction coefficient set based on a distance to one of the plurality of subjects selected based on a touch applied to one of the plurality of selection images.

13. The mobile terminal of claim 1, wherein the controller is further configured to:
additionally extract a three-dimensional object from the image; and
correct the image based on a distance from the center of the image to the three-dimensional object.

14. The mobile terminal of claim 1, wherein the controller is further configured to:
cause the display to display a preview image corresponding to the image, a photographing icon also displayed with the preview image;
extract the at least one object corresponding to the face and included in the preview image; and
correct the extracted at least one object and cause the display to display the corrected at least one object based on a distance between a center of the preview image and the extracted at least one object.

15. The mobile terminal of claim 14, further comprising a memory,
wherein the controller is further configured to cause the memory to store a corrected image in response to a touch applied to the photographing icon.

16. The mobile terminal of claim 1, wherein when a subject of the extracted at least one object does not have a three-dimensional shape, the controller is further configured to restrict modification of the extracted at least one object.

17. The mobile terminal of claim 1, further comprising a memory,
wherein the controller is further configured to cause the memory to store the image and a correction image to be mapped to each other.

18. The mobile terminal of claim 17, wherein the controller is further configured to cause the display to display a popup window prompting whether to store at least one of the image or the correction image when the camera is activated.

19. The mobile terminal of claim 1, wherein the controller is further configured to cause the display to:
display a first icon for correcting the image when the image is displayed; and
display a second icon for displaying the image prior to the correction when the corrected image is displayed.

20. A control method performed by a mobile terminal, comprising:
receiving, by a camera, an image;
displaying the image on a display;
extracting an object corresponding to a face that is present in the image; and
generating a correction image by modifying a certain region of the extracted object based on a distance from a center of the image to the extracted object in the image.

* * * * *